United States Patent [19]

Kishino et al.

[11] Patent Number: 5,763,068
[45] Date of Patent: Jun. 9, 1998

[54] FLUORORESIN-COATED MEMBER, PRODUCTION METHOD THEREFOR AND HEAT FIXING DEVICE USING THE COATED MEMBER

[75] Inventors: Kazuo Kishino; Hiroaki Kumagai, both of Kawasaki; Masaaki Takahashi, Asaka; Hideo Kawamoto, Kawasaki; Hideyuki Hatakeyama, Yokohama, all of Japan

[73] Assignee: Canon Kabushiki Kaisha, Tokyo, Japan

[21] Appl. No.: 619,438

[22] Filed: Mar. 21, 1996

[30] Foreign Application Priority Data

Mar. 27, 1995 [JP] Japan .................. 7-067962

[51] Int. Cl.[6] .................................................. B32B 5/16
[52] U.S. Cl. ................. 428/323; 428/421; 428/474.4; 428/906; 492/56
[58] Field of Search .................. 428/323, 421, 428/474.4, 906; 492/56

[56] References Cited

U.S. PATENT DOCUMENTS 5,547,742  8/1996  Satoh et al. ............................ 428/215
5,582,886  12/1996  Kitajima et al. ..................... 428/36.91

FOREIGN PATENT DOCUMENTS 61-128274  6/1986  Japan .

Primary Examiner—Mark Chapman
Attorney, Agent, or Firm—Fitzpatrick, Cella, Harper & Scinto

[57] ABSTRACT

The present invention provides a fluororesin-coated member having a fluororubber layer containing a fluororesin, and a fluororesin layer formed on the fluororubber layer. The fluororesin layer is a uniform layer formed by coating an aqueous fluororesin dispersion coating and burning it, and exhibits excellent surface smoothness and durability of adhesion to the fluororubber layer. The present invention also provides a method of producing the fluororesin-coated member.

9 Claims, 2 Drawing Sheets

1

FLUORORESIN-COATED MEMBER, PRODUCTION METHOD THEREFOR AND HEAT FIXING DEVICE USING THE COATED MEMBER

BACKGROUND OF THE INVENTION

1. Field of the Invention

The present invention relates to a member comprising an elastic rubber layer coated with a fluororesin, a production method therefor, and a fixing member and heat fixing device used for forming electrophotographic images in a copying machine, a printer, and the like.

2. Description of the Prior Art

A member comprising a rubber layer coated with a fluororesin is employed for various uses which require elasticity of the rubber layer, and releasing properties and smoothness of the fluororesin. For example, such a member is used as a member for fixing a toner image formed by an electrophotographic system, a cleaning blade for an electrophotographic photosensitive member and the like. Such a coated member is formed by a known method in which a fluororesin powder is contained in a rubber layer in order to improve adhesion between the rubber layer and the fluororesin layer, and the fluororesin is coated on the rubber layer by electrostatically coating the fluororesin powder and then burning the layer (Japanese Patent Laid-Open No. 61-128274).

However, during burning of the fluororubber layer, a large amount of fluororesin powder is bled out on the surface of the fluororubber layer, and thus easily causes the problems of cracks and irregularity in the surface of the fluororesin layer.

A conceivable method for attaining the smoothness of the surface is to laminate a fluororesin film and heat-melt it instead of coating and burning of a fluororesin powder. However, in lamination on a cylindrical substrate, this method causes a problem of processing a joint, which is peculiar to the lamination method.

SUMMARY OF THE INVENTION

An object of the present invention is to provide a fluororesin-coated member comprising a uniform fluororesin layer having excellent adhesion.

Another object of the present invention is to provide a method of producing the coated member.

A further object of the present invention is to provide a fixing member and a heat fixing device comprising the coated member.

In order to achieve the objects, in accordance with an aspect of the present invention, there is provided a fluororesin-coated member comprising a fluororubber layer containing a fluororesin, and a fluororesin layer formed thereon, wherein the fluororesin layer is a uniform layer formed by coating an aqueous fluororesin dispersion coating.

In accordance with another aspect of the present invention, there is provided a fixing member comprising a substrate, and a fluororubber layer containing a fluororesin and a fluororesin layer as a coating layer for the fluororubber layer, both of which are formed on the substrate, wherein the fluororesin layer is a uniform layer formed by coating an aqueous fluororesin dispersion on the fluororubber layer and then burning the coating.

In accordance with a further aspect of the present invention, there is provided a method of producing a fluororesin-coated member comprising a fluororubber layer containing a fluororesin, and a fluororesin layer formed on the fluororubber layer, the method comprising vulcanizing the fluororubber layer, coating an aqueous fluororesin dispersion coating on the fluororubber layer, and then drying and burning the fluororesin layer to form a uniform fluororesin layer.

In the present invention, since the fluororesin layer is formed by coating the aqueous fluororesin dispersion coating on the fluororubber layer containing the fluororesin, the uniform fluororesin layer having excellent surface smoothness and durability of adhesion to the fluororubber layer can be obtained.

Namely, since the uniform fluororesin layer is formed by uniformly coating the aqueous fluororesin dispersion coating, the present invention is capable of forming the fluororesin layer which has excellent surface smoothness possessed by the uniformly coated aqueous fluororesin dispersion coating, and excellent adhesion durability due to interaction with the fluororesin contained in the fluororubber layer.

The method of producing the fluororesin layer of the present invention comprises the first step of vulcanizing the fluororubber layer, the second step of coating the aqueous fluororesin dispersion coating and drying the coating, and the third step of burning the dried fluororesin coating. The fluororesin contained in the rubber layer is not bled out on the surface of the rubber layer during vulcanization, and the aqueous fluororesin dispersion coating can thus easily be coated in the second step. As a result, the continuous fluororesin layer having the surface without cracks, i.e., the uniform fluororesin layer, is formed after burning. Namely, the uniform fluororesin layer can be formed by vulcanization curing treatment at a temperature which permits the formation of the uniform fluororesin layer.

DESCRIPTION OF THE PREFERRED EMBODIMENT OF THE PRESENT INVENTION

Figure 1:
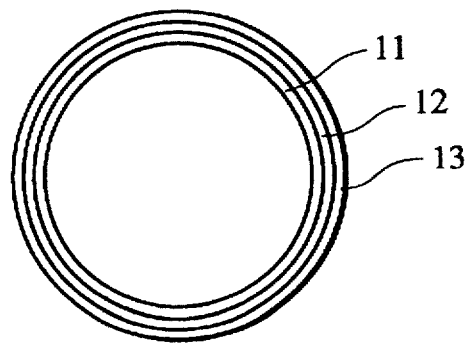
FIG. 1 is a sectional view of a fixing film of the present invention.

As an aqueous fluororesin dispersion coating, a fluororesin dispersion which is an aqueous colloidal dispersion of fluororesin fine particles, an aqueous enamel coating obtained by mixing a nonionic surfactant, a thickener, a crack inhibitor, a pH adjustor, etc. with the aqueous colloidal dispersion can be used.

A fluororubber exhibiting elasticity by a crosslinking reaction can be used. Examples of such fluororubber include so-called vinylidene fluoride type fluororubber comprising vinylidene fluoride (VDF) as a main component, propylene/tetrafluoroethylene type fluororubber comprising an alternating copolymer of tetrafluoroethylene (TFE) and propylene (P) as a base, and the like.

Thermoplastic fluororesins having melting points can be used. The melting points can be measured by a DSC (Differential Scanning Calorimeter), and the melting points of main fluororesins are given below.

PTFE (polytetrafluoroethylene) 327° C.

PFA (tetrafluoroethylene/perfluoroalkyl vinyl ether copolymer) 302°–310° C.

FEP (tetrafluoroethylene/hexafluoropropylene copolymer) 270° C.

ETFE (tetrafluoroethylene/ethylene copolymer) 260° C.

The vulcanization temperature of the fluororubber layer is set so that a uniform fluororesin layer, i.e., a continuous fluororesin layer having no cracks, can be formed. Assuming that the melting point of the fluororesin contained in the fluororubber layer is $mp_1$, a vulcanization temperature of ($mp_1$ - 30° C.) or less, particularly, ($mp_1$ - 40° C.) or less, is preferable for preventing the phenomenon that the fluororesin contained in the fluororubber layer is bled out on the surface. The burning temperature of the fluororesin layer is preferably higher than the melting point of the fluororesin, i.e., ($mp_1$ - 40° C.) or more, particularly, ($mp_1$ - 30° C.) or more.

Preferred embodiments of the present invention are described below.

The fluororubber layer is formed by coating a polyamine vulcanization type fluororubber coating containing a fluororesin and drying the coating, and then vulcanizing at a temperature within the range of 100° C. to 230° C. The smoothness of the fluororubber layer affects the smoothness of the finished fluororesin layer. Thus, the fluororubber layer is preferably formed by using a fluororubber coating so that smoothness is obtained by leveling the coating. The coating is not affected by the shape of the substrate used, and is thus advantageous for processing. In this case, since the producing process comprising the coating and drying steps is long, polyamine vulcanization type fluororubber which is vulcanized at a relatively low speed is easy to handle.

At a vulcanization temperature of 100° C. or less, the reaction hardly proceeds, and vulcanization is not sufficiently effected. On the other hand, at a vulcanization temperature exceeding 230° C., since the fluororesin particles mixed in the fluororubber are bled out on the surface at the same time as vulcanization, the surface is rich in fluororesin. Heating to a temperature above the melting point of the fluororesin causes melting of the bled fluororesin to form a fluororesin thin film on the surface of the fluororubber layer. In both cases, in the second step, coating properties of the aqueous fluororesin coating on the surface of the fluororubber layer deteriorates, and thus a fluororesin layer having a uniform surface cannot be obtained after burning. The vulcanization time may be selected so that vulcanization sufficiently proceeds at the vulcanization temperature selected.

Burning the coating of the fluororesin is preferably carried out at a temperature within the range of 300° C. to 350° C.

The purposes of burning are to form a film by heat melting the coated fluororesin, and to make the interface of the fluororubber layer and the surface layer rich in fluororesin particles contained in the fluororubber, to strengthen the adhesion therebetween by melting the particles. For these purposes, burning is preferably carried out at 300° C. or more, and at 350° C. or less for preventing the fluororubber layer from becoming brittle due to heat deterioration of the fluororubber.

When the fluororesin-coated member is used as a heat fixing member of an electrophotographic image forming apparatus, the fluororubber layer and the fluororesin layer are formed on an appropriate substrate. A film and a roller are used as the substrate. A fixing belt comprising a film used as a substrate is a fixing member used for a film fixing method which is employed for saving energy. The film fixing method is a fixing method in which unfixed toner on a transfer material is heated through a film-formed endless belt. In this fixing method, the fixing film and a press roller are put into pressure contact, and transfer paper on which the unfixed toner image is formed is passed between the fixing film and the press roller to fusion bond the toner onto the transfer material by a ceramic heater for direct heating.

FIG. 1 shows a typical example of such a fixing film. In FIG. 1, a fluororesin-containing rubber layer 12 and a fluororesin layer 13 are formed on a heat-resistant cylindrical film 11 used as a substrate.

The fluororesin-coated member of the present invention comprises the fluororesin surface film having good smoothness and strong adhesion durability, and is thus suitable for use as a fixing member which is repeatedly deformed at a high temperature for a long time. Particularly, the fixing film directly contacts the unfixed toner image, and the surface properties of the fixing film significantly affect the quality of the fixed image. Therefore, the fixing film is further required to have surface smoothness.

The surface smoothness of the fixing film is generally indicated by ten-point average roughness Rz. With average roughness Rz over 10 μm, surface irregularity of the fixing film remains as transfer marks on a solid black image. The average roughness Rz is thus preferably 5 μm or less.

Since the fluororubber containing the fluororesin is formed as a coating, a smooth surface can easily be formed on the cylindrical film. The coating method is not limited, and any conventional coating method such as a spray method, a dipping method and the like, which are capable of forming uniform films, can be employed.

Although various heat-resistant films can be used as the cylindrical film for the fixing film, curable polyimide resins having thermal conductivity within the range of $5 \times 10^{-4}$ to $8 \times 10^{4}$ cal/cm·sec·°C., are particularly preferred.

The thickness of the film is preferably at least 10 μm from the viewpoint of strength, and not more than 80 μm from the viewpoint of thermal conductivity.

The cylindrical film which is formed by dip molding using polyimide varnish containing no filler can generally be formed to have a very smooth surface, i.e., Rz of 1 μm or less. However, when polyimide varnish containing a thermal conductive filler is molded, irregularities sometimes occur in the surface of a belt. The fluororesin coating method in accordance with a fourth aspect of the present invention is capable of decreasing such irregularities by coating a fluororesin rubber coating containing the fluororesin dispersed therein, thereby forming a fixing film having a relatively smooth fluororesin surface.

Figure 2:
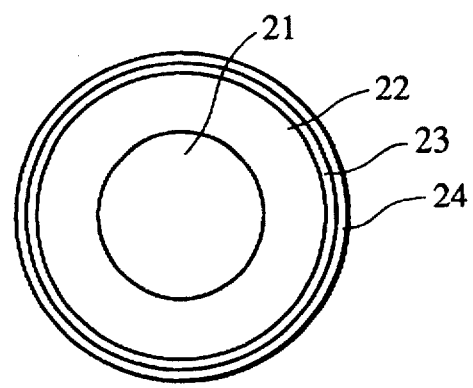
FIG. 2 is a sectional view of a press roller of the present invention.

When the fixing member comprises a fixing roller, a roller is used as a substrate. FIG. 2 shows a typical example of such a fixing roller. In FIG. 2, a silicone rubber roller 22, a fluororesin-containing fluororubber layer 23 and a fluororesin layer 24 are provided on a core metal 21.

The fixing roller is referred to as a "heat roller" and a "press roller". The heat roller comprises an electrothermal heater disposed therein so that a recording sheet having a toner image formed thereon is passed between the heat roller and the press roller in pressure contact therebetween to melt-fix the toner to the recording sheet under heating of the toner. During this fixing, the elastic layer which contacts the toner is known to have a fixing effect, and the rubber layer is thus required to have some degree of thickness for obtaining the sufficient fixing effect. The heat roller is also required to have thermal conductivity. The thickness of the rubber layer is preferably 100 μm to 2 mm in order to balance the above two points.

The press roller is required to ensure an area of contact with a heat source such as the heat roller or the like, which is caused by elastic deformation, and preferably has a rubber thickness of 1 mm to 5 mm.

It is thus necessary that the fluororesin layer coated on the rubber layer has smoothness for obtaining a good fixed toner image and adhesion durability which permits repeated deformation at a high temperature over a long time. The fluororesin-coated member of the present invention is suitable for the fixing rollers.

The press roller preferably comprises a silicone rubber roller serving as a substrate and having rubber hardness of 30° (JIS-A) or less.

The press roller obtained in the present invention not only has satisfactory surface smoothness and adhesion durability of the fluororesin layer, but also exhibits satisfactory conveying properties if a thin fluororesin layer is coated on a rubber roller having low rubber hardness.

The thickness of the fluororesin layer is preferably 5 to 30 µm in view of friction during use and film-forming properties in processing.

Figure 3:
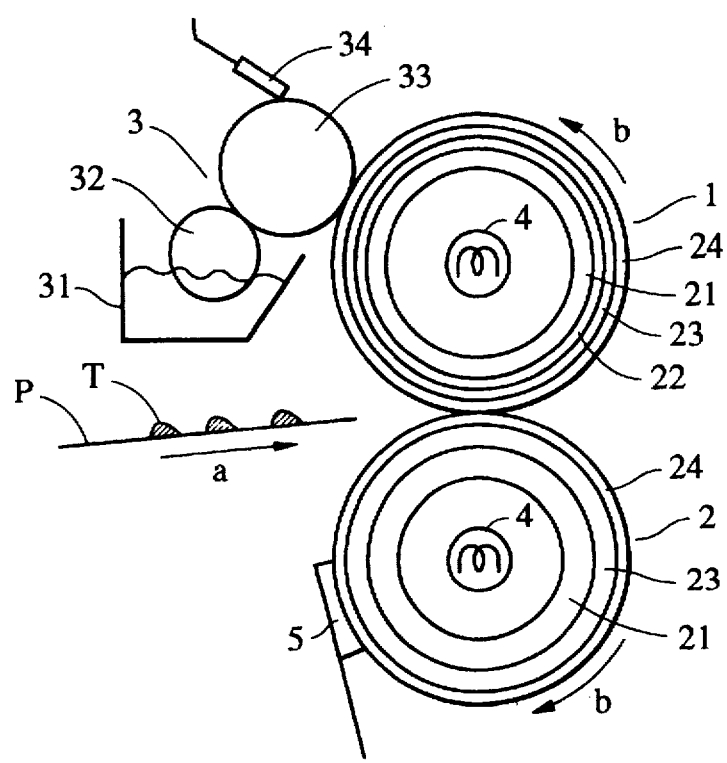
FIG. 3 is a schematic sectional view of a heat fixing device of the present invention.

FIG. 3 is a schematic sectional view of a fixing member of the present invention which is used for a heat fixing device.

Fixing rollers include a fixing roller 1 and a press roller 2, and oil coating means 3 is disposed for coating silicone oil for releasing toner on the surface of the fixing roller 1.

The fixing roller 1 comprises a core metal 21 as a substrate made of aluminum or the like, an elastic layer 22 containing HTV (millable) silicone rubber and formed on the core metal 21, and a fluororubber layer 23 containing a fluororesin and formed on the elastic layer 22. A fluororesin layer 24 is further formed on the fluororubber layer 23.

The press roller 2 comprises a core metal 21 made of aluminum or the like, a fluororesin-containing fluororubber layer 23 formed on the core metal 21, and a fluororesin layer 24 formed on the layer 23.

A halogen heater 4 is disposed as a heat generator in each of the core metals 21 of the fixing roller 1 and the press roller 2. The temperature of the press roller 2 is detected by a thermister 5 in contact with the press roller 2 so that the temperatures of the fixing roller 1 and the press roller 2 are maintained constant, for example, at 170° C., by turning on and off the halogen heaters 4. The fixing roller 1 and the press roller 2 are rotated in the direction shown by arrow b by a driving device (not shown), and a recording material P such as paper, a film or the like, which is conveyed in the direction shown by arrow a by a conveyor device (not shown), is passed between the two rollers while being held therebetween. As a result, an unfixed toner image T on the recording material P is fixed onto the recording material p by virtue of heat and pressure of both rollers. The oil coating means 3 comprises supply rollers 32 and 33 for absorbing offset preventing silicone oil which is contained in a container 31 so as to coat the silicone oil on the surface of the fixing roller 1. The amount of the silicone oil coated is adjusted by the contact angle and pressure of an oil adjusting blade 34 which contacts the supply roller 33. A cleaner may be provided on the fixing roller 1 and the press roller 2 so as to clean off toner stains which adhere to the roller surfaces.

EXAMPLE 1

[Example 1-1]

Fluororubber containing a fluororesin was molded by press vulcanization under vulcanization conditions of 160° C. and 30 min. on an aluminum plate of 20 mm×100 mm which was previously treated with primer and which had t=0.5 mm. After molding, the surface was polished to obtain the aluminum plate with a rubber layer of 20 mm×100 mm, having a total thickness of 2.5 mm.

The fluororesin-containing fluororubber used was prepared by kneading polyol vulcanizer-containing fluororubber (trade name: Daiel G751, Daikin Kogyo) used as fluororubber, and PFA powder (trade name: MP10, Mitsui.Du Pont Chemical) used as a fluororesin at a ratio by weight of 1:1, using a kneading open roll.

The polished surface was finished to Rz=16 µm.

An aqueous fluororesin dispersion coating (trade name: Neoflon FEP Dispersion ND-1, Daikin Kogyo) was then coated to a thickness of about 10 µm on the thus-obtained rubber plate by spray coating.

The coating could be uniformly performed without the problem of coating properties. The coated layer was then dried at 60° C. for 30 minutes, and then burned in a warm air circulating oven at 310° C. for 30 minutes. After burning, the fluororesin film had surface roughness Rz=12 µm and no problem with respect to adhesion to the fluororubber.

[Example 1-2]

A silicone rubber plate with an aluminum plate (t=0.5 µm), which was finished to Rz=16 µm, of 20 mm×100 mm having a total thickness of 2.5 mm was treated with primer, and a polyamine vulcanization type fluororubber coating containing a fluororesin was coated to a thickness of about 20 µm on the rubber plate by spray coating. The coated layer was dried at 60° C. for 30 minutes, and then burned in a warm air circulating oven at 200° C. for 20 minutes. Polyamine vulcanization type fluororubber coating (trade name: Daiel GLS-213, Daikin Kogyo) containing FEP fluororesin was used.

Aqueous fluororesin dispersion coating ND-1 was then coated and dried in the same manner as in Example 1-1. As a result, coating could uniformly be performed without a problem of coating properties. Burning was then carried out in the same manner as in Example 1-1 to obtain a fluororesin-coated rubber plate. After burning, the fluororesin film had roughness of Rz=6 µm and strong adhesion to the fluororubber layer.

[Example 1-3]

A fluororesin-coated rubber plate was obtained by the same method as in Example 1-2 except that a fluororubber coating was vulcanized at 150° C. for 30 minutes. The resultant fluororesin layer had surface roughness of Rz=7 µm and strong adhesion to the fluororubber layer.

[Comparative Example 1-1]

The same steps up to burning as in Example 1-2 were performed except that the step of vulcanizing the fluororubber coating was omitted. However, since small cracks occurred on the fluororubber layer during burning, a uniform fluororesin layer was not formed. This was because the fluororubber layer was not vulcanized, and the fluororubber layer was thus broken during burning.

[Example 1-2]

The same steps up to coating of the aqueous fluororesin coating as in Example 1-2 were performed except that burning was carried out at 250° C. for 70 minutes in place of vulcanization of the fluororubber coating. However, since the fluororesin contained in the fluororubber layer exuded to the surface, coating properties deteriorated, and the coating surface was made nonuniform. Although burning was successively performed, a continuous fluororesin layer was not obtained.

The results obtained are summarized in Table 1.

TABLE 1

|  | Example 1-1 | Example 1-2 | Example 1-2 | Comparative Example 1-1 | Comparative Example 1-2 |
|---|---|---|---|---|---|
| Substrate | Al body | Al plate + silicone rubber*¹ | ← | ← | ← |
| Fluororesin-dispersed fluororubber | Bulk form*¹ Vulcanization condition 160° C. × 30 min | Form of coating Vulcanization condition 200° C. × 20 min | ← Vulcanization condition 150° C. × 30 min | ← Vulcanization condition 60° C. × 30 min*² | ← Vulcanization condition 250° C. × 70 min |
| Aqueous fluororesin coating | Good coating properties | Good coating properties | Good coating properties | Good coating properties | Poor coating properties |
|  | Burning condition 310° C. × 30 min | ← | ← | ← | ← |
| Finished surface roughness | Rz = 12 μm | Rz = 6 μm | Rz = 7 μm | Crack occurred. | Impossible to form a film |
| Adhesion | Good | Good | Good |  |  |

*¹The surface was finished to 16 μm by polishing.
*²Only drying

Proper vulcanization of the fluororesin-dispersed fluororubber enables the formation of a layer by burning the aqueous fluororesin dispersion coating. The use of a coating of fluororesin-dispersed fluororubber can improve the smoothness of the finished surface.

The present invention is not limited to the examples, and the coating method of the present invention can be applied for coating fluororesins on plate-formed members such as a cleaning blade, a development blade, an oil scraping blade, etc. of an electrophotographic image forming apparatus.

EXAMPLE 2

Description will now be made of examples in which the method of coating a fluororesin on an elastic material of the present invention is applied to the surface of a fixing film of an electrophotographic image forming apparatus.

[Example 2-1]

A cylindrical film having an outer diameter of 20 mm, a length of 230 mm and a thickness of 30 μm and comprising heat curable polyimide having thermal conductivity of 6.5×10$^{-4}$ cal/cm·sec. °C. was prepared. The surface roughness of the film was as large as Rz=12 μm. The surface of this film was treated with epoxy primer, and a polyamine type fluororubber coating containing a fluororesin was coated to a thickness of about 50 μm on the film by spray coating. After drying at 60° C. for 30 minutes, the rubber coating was vulcanized in a warm air circulating oven at 200° C. for 30 minutes. Daiel GLS-213 produced by Daikin Kogyo was used as the polyamine type fluororubber coating containing a fluororesin. An aqueous fluororesin dispersion coating was then coated to a thickness of about 10 μm by spray coating. A mixture of aqueous fluororesin coatings (trade name: Neoflon FEP Dispersion ND-1 and Neoflon PFA Dispersion AD-2, Daikin Kogyo) at a ratio by weight of 1:1 was used. Coating could be uniformly performed without a problem of coating properties.

After drying at 60° C. 30 minutes, the film was burned in a warm air circulating oven at 330° C. for 60 minutes to obtain a fixing film.

[Example 2-2]

A fixing film was obtained by the same method as in Example 2-1 except that the final burning was carried out at 380° C. for 30 minutes.

[Example 2-3]

A fixing film was obtained by the same method as in Example 2-1 except that the fluororesin coating was coated to a thickness of about 15 μm by spray coating.

[Comparative Example 2-1]

The steps up to coating of the aqueous fluororesin dispersion coating were performed in the same manner as in Example 2-3 except that burning was carried out at 300° C. for 15 minutes after drying of the fluororesin coating in place of vulcanization. However, coating properties deteriorated, and nonuniformity occurred in the coating surface. Although the steps up to burning were successively performed to form a fixing film, a continuous fluororesin layer could not be obtained.

[Comparative Example 2-2]

The steps up to burning were performed for forming a fixing film in the same manner as in Example 2-3 except that the vulcanization step after coating and drying of the fluororubber coating was omitted. However, cracks occurred, and the surface was significantly rough.

[Experimental Example]

The fixing films of Examples 2-1 to 2-3 and Comparative Examples 2-1 and 2-2 were incorporated into a laser beam printer (trade name: LBP Laser Shot A404, Canon) to form images. Evaluation of the images, and durability tests produced the results shown in Table 2.

TABLE 2

| Substrate |  | Example 2-1 | Example 2-2 | Example 2-3 | Comparative Example 2-1 | Comparative Example 2-2 |
|---|---|---|---|---|---|---|
| Fluororesin dispersed fluororubber | Thickness | 50 μm | ← | 15 μm | 15 μm | 15 μm |
|  | Vulcanization temperature | 200° C. × 60 min | ← | ← | 300° C. × 15 min | 60° C. × 30 min |

TABLE 2-continued

| Substrate | | Example 2-1 | Example 2-2 | Example 2-3 | Comparative Example 2-1 | Comparative Example 2-2 |
|---|---|---|---|---|---|---|
| coating | | | | | | |
| Aqueous fluororesin coating | Thickness | 10 μm | ← | ← | ← | ← |
| | Burning conditions | 200° C. × 60 min | 200° C. × 60 min | 200° C. × 60 min | ← | ← |
| Results of actual machine evaluation | Image quality | O | O | O | X | X |
| | Fixing properties | O | O | O | — | — |
| | Adhesion durability | 100,000 sheets OK | ← | ← | — | — |

In evaluation of images, it was checked whether the roughness of a film surface remains as transfer marks on a fixed solid black image. Both comparative examples showed an unpractical level (X) of image quality. Fixing properties were decided by a decrease in density when the fixed solid black image was rubbed with transfer paper a predetermined number of times with a predetermined load. All examples showed a practical level of fixing properties, and particularly, Example 2-1 was excellent (o). This is due to the effect of elasticity of the fluororubber layer of 50 μm. On the other hand, Example 2-2 having the same fluororubber layer of 50 μm as Example 2-1 showed fixing properties which were inferior to Example 2-1 but at a practical level (o). This was caused by the fact that the fluororubber was hardened by heat deterioration during burning, and thus the elasticity slightly deteriorated. The durability tests were carried out by continuously passing A4-size sheets in a specified pattern. Particularly, adhesion durability of the fluororesin layer was observed. In test of the fixing films of Examples, 100,000 sheets could completely be passed without any trouble, and the fixing films were confirmed to have adhesion durability sufficient for fixing films.

EXAMPLE 3

Examples as follow in which the method of coating a fluororesin on an elastic material of the present invention was applied to the surface of a press roller of an electrophotographic image forming apparatus.

[Example 3-1]

A silicone rubber roller having an outer diameter of 16 mm, a rubber thickness of 3 mm, a rubber length of 220 mm and a rubber hardness of 25° (JIS-A) was prepared by coating silicone rubber on an aluminum core metal treated with primer, by using a pipe mold. After the surface of the silicone rubber roller was treated with epoxy primer, a polyamine vulcanization type fluororubber coating containing a fluororesin was coated to a thickness of about 30 μm by spray coating. After drying at 60° C. for 30 minutes, the fluororubber coating was vulcanized by irradiation of the roller surface with near infrared rays for several tens seconds until the roller surface reached 150° C. A rod-formed near infrared lamp was installed in parallel with the roller axis, and the roller was rotated at a constant speed so that the surface was uniformly heated.

Daiel GLS-213 was used as the polyamine vulcanization type fluororubber coating containing fluororesin.

An aqueous fluororesin dispersion coating was then coated to a thickness of about 15 μm by spray coating. An aqueous fluororesin coating (trade name: Neofleon FEP Dispersion ND-4, Daikin Kogyo) was used coating could be uniformly performed without a problem of coating properties. After drying at 60° C. or 30 minutes, the roller was burned in a warm air circulating oven at 315° C. for 40 minutes to obtain a press roller.

[Example 3-2]

A press roller was obtained by the same method as in Example 3-1 except that the thickness of the fluororesin coating was about 20 μm, the roller surface reached to a temperature of 220° C. by irradiation with near infrared rays, and the thickness of the aqueous fluororesin coating was about 25 μm.

[Comparative Example 3-1]

A press roller was obtained by the same method as in Example 3-1 except that the roller surface reached a temperature of 90° C. by irradiation with near infrared rays. However, cracks occurred in the fluororubber layer during burning.

[Comparative Example 3-2]

A press roller was obtained by the same method as in Example 3-1 except that the roller was burned in a warm air circulating oven at 310° C. for 30 minutes in place of irradiation with near infrared rays. However, the coating properties of the aqueous fluororesin dispersion coating deteriorated, and a continuous fluororesin layer could not be obtained after burning.

[Experimental Example]

The press rollers of Examples 3-1 and 3-2 and Comparative Examples 3-1 were incorporated into LBP Laser Shot A404 (Canon), and a test of continuously passing A4-size sheets was performed for confirming conveyance properties and durability. The results shown in Table 3 were obtained.

TABLE 3

| | | Example 3-1 | Example 3-2 | Comparative Example 3-1 |
|---|---|---|---|---|
| Fluororesin-dispersed fluororubber coating | Thickness | 30 μm | 20 μm | ← |
| | Vulcanization temperature | 150° C. | 220° C. | 90° C. |

TABLE 3-continued

|  |  | Example 3-1 | Example 3-2 | Comparative Example 3-1 |
|---|---|---|---|---|
| Aqueous fluororesin coating | Thickness | 15 μm | 25 μm | ← |
|  | Burning Conditions | 315° C. × 30 min | ← | 315° C. × 30 min |
| Results of actual machine evaluation | Coating properties | Good | Good | Good |
|  | Durability test | 100,000 sheets OK | 100,000 sheets OK | Poor |

A fixing device of LBP Laser Shot A404 employs a system in which transfer paper is conveyed by press roller driving and fixing film driven mechanisms, and the press roller is thus required to have sufficient force to convey sheets. However, the press rollers of all examples have sufficient force to convey sheets, and durability for completing passage of 100,000 sheets without any trouble. It can be thus confirmed that the press rollers of the examples have sufficient durability of adhesion to the fluororesin layer for press rollers. A tube-coated roller having the same size and roller hardness as the rollers of the examples and comprising a silicone rubber material having a hardness of 15° and coated with a PFA tube having a thickness of 50 μm exhibited insufficient force to convey sheets. As a result of experiment in the same manner as described above, the tube-coated roller sometimes produced conveyance error due to slip on transfer paper.

Since the press roller of comparative Example 3-1 produced accumulation of toner in the cracks in the surface of the roller during passage of transfer sheets, the test was stopped at the time 10,000 sheets was passed.

What is claimed is:

1. A fluororesin-coated member comprising: a vulcanized fluororubber layer containing a fluororesin, and a fluororesin layer formed on the vulcanized fluororubber layer, wherein the fluororesin layer is a uniform layer formed by coating an aqueous fluororesin dispersion coating and burning the coating.

2. A fluororesin-coated member according to claim 1, wherein the fluororubber of the vulcanized fluororubber layer comprises polyamine vulcanization type fluororubber.

3. A fixing member comprising a substrate, a vulcanized fluororubber layer containing a fluororesin, and a fluororesin layer as a coating layer for the vulcanized fluororubber layer, wherein the fluororesin layer is a uniform layer formed by coating an aqueous fluororesin dispersion coating and burning the coating.

4. A fixing member according to claim 3, wherein the substrate comprises a film.

5. A fixing member according to claim 4, wherein the film is a curable polyimide resin film having a thermal conductivity within the range of $5 \times 10^{-4}$ to $8 \times 10^{-4}$ cal/cm·sec·°C.

6. A fixing member according to claim 3, wherein the substrate comprises a roller.

7. A fixing member accordingly to claim 3, wherein vulcanization of the vulcanized fluororubber layer is conducted at a temperature at least 30° C. less than the melting point of the fluororesin contained in the vulcanized fluororubber layer.

8. A fixing member according to claim 7, wherein vulcanization of the vulcanized fluororubber layer is conducted at a temperature at least 40° C. less than the melting point of the fluororesin contained in the vulcanized fluororubber layer.

9. A fixing member according to claim 7, wherein the burning is conducted at a temperature at least as high as the melting point of the fluororesin layer.

* * * * *

UNITED STATES PATENT AND TRADEMARK OFFICE
CERTIFICATE OF CORRECTION

PATENT NO. : 5,763,068

DATED : June 9, 1998

INVENTOR(S): KAZUO KISHINO ET AL.

It is certified that error appears in the above-identified patent and that said Letters Patent is hereby corrected as shown below:

COLUMN 4
Line 32, "8x10$^4$" should read --8x10$^{-4}$)--.

COLUMN 5
Line 40, "thermister 5" should read --thermistor 5"--;
Line 49, "material p" should read --material P--.

COLUMN 7
Table 1, "Example 1-2" (second occurrence) should read --Example 1-3--.

COLUMN 10
Line 19, "used coating" should read --used. Coating--.

Signed and Sealed this

Second Day of March, 1999

Attest:

Q. TODD DICKINSON

*Attesting Officer*  *Acting Commissioner of Patents and Trademarks*